US011597281B2

(12) United States Patent
Gurevich et al.

(10) Patent No.: US 11,597,281 B2
(45) **Date of Patent: *Mar. 7, 2023**

(54) DUAL RAIL TRACK SYSTEM FOR INDUSTRIAL CONTROL

(71) Applicant: Rockwell Automation Technologies, Inc., Mayfield Heights, OH (US)

(72) Inventors: Ilya Gurevich, Milwaukee, WI (US); Paul J. Grosskreuz, West Bend, WI (US); Juan A. Fernandez, Brown Deer, WI (US); Rui Zhou, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 372 days.

This patent is subject to a terminal disclaimer.

(21) Appl. No.: 16/909,048

(22) Filed: Jun. 23, 2020

(65) Prior Publication Data

US 2020/0317062 A1 Oct. 8, 2020

Related U.S. Application Data

(63) Continuation of application No. 15/891,516, filed on Feb. 8, 2018, now Pat. No. 10,723,232.

(51) Int. Cl.

| | |
|---|---|
| ***B60L 13/06*** | (2006.01) |
| ***B61C 13/04*** | (2006.01) |
| ***B65G 54/02*** | (2006.01) |

(52) U.S. Cl.

CPC .............. *B60L 13/06* (2013.01); *B61C 13/04* (2013.01); *B65G 54/02* (2013.01);

(Continued)

(58) Field of Classification Search

CPC .......... B60L 13/06; E01B 25/00; E01B 25/22; E01B 25/24; B61B 3/00; B61B 3/02

See application file for complete search history.

(56) References Cited

U.S. PATENT DOCUMENTS

| | | | | |
|---|---|---|---|---|
| 10,723,232 | B2 * | 7/2020 | Gurevich | B65G 54/02 |
| 2003/0230941 | A1 | 12/2003 | Jacobs | |
| 2019/0241074 | A1 | 8/2019 | Gurevich et al. | |

FOREIGN PATENT DOCUMENTS

| | | |
|---|---|---|
| EP | 3078617 A1 | 10/2016 |
| GB | 2 225 996 | 6/1990 |

(Continued)

OTHER PUBLICATIONS

Extended European Search Report for corresponding European Application 19155850.1-1017 dated Jun. 6, 2019 (10 pages).

*Primary Examiner* — Robert J McCarry, Jr.

(74) *Attorney, Agent, or Firm* — Boyle Fredrickson, SC

(57) ABSTRACT

The present invention provides a dual rail track system for independently moveable carts in an industrial control environment in which upper and lower rails of a track are substantially "L" shaped to allow upper and lower groups of rollers of a cart to orthogonally contact the upper and lower rails, respectively, to provide vertical and horizontal control of the cart while in motion along the track. The shape of the rails and arrangement of the rollers, orthogonal with respect to the rails in vertical and horizontal planes, provides an efficient support system allowing high speed. movement of carts, including through turns, with only two rails and with symmetric weight distribution of the cart. Flexible members provided with respect to each roller also provide resiliency to allow the rollers to adapt to variations in the track.

20 Claims, 3 Drawing Sheets

(52) U.S. Cl.
CPC ... *B60L 2200/26* (2013.01); *B65G 2203/0283* (2013.01); *B65G 2203/043* (2013.01)

(56) References Cited

FOREIGN PATENT DOCUMENTS

| | | |
|---|---|---|
| JP | 0532312 | 2/1993 |
| WO | 2016/129797 | 8/2016 |

* cited by examiner

DUAL RAIL TRACK SYSTEM FOR INDUSTRIAL CONTROL

CROSS REFERENCE TO RELATED APPLICATION(S)

This application claims priority to U.S. patent application Ser. No. 15/891,516, entitled "Dual Rail Track System for Industrial Control," filed on Feb. 8, 2018, which is herein incorporated by reference.

FIELD OF THE INVENTION

The subject matter disclosed herein relates generally to industrial control systems, and more particularly, to a dual rail track system for industrial control in which rollers of an independently moveable cart engage perpendicular extension portions projecting from each rail of the track for moving objects in the system.

BACKGROUND OF THE INVENTION

In industrial control systems, it is often desirable to move objects from one location to another for accomplishing various tasks. For example, rolling conveyors are often used to move objects from one location to another for interacting with different machines of an industrial. control process, such as a first machine at a first location for placing a box, a second machine at a second location for filling the box, and a third machine at a third location for closing the box.

More recently, a track system has been developed in which multiple "carts" can be independently driven along a "track" for accomplishing the various tasks of the industrial control process. By providing independently controllable carts, the timing of each task can be more precisely controlled than traditional systems such as rolling conveyors.

However, in such track systems having moving carts, the carts should be able to support loads typical of an industrial control or factory environment while capable of being positioned and retained on a curvilinear track with increasing speeds. The carts should also be able to accommodate manufacturing/assembly variations which might occur on the track. It is therefore desirable to provide an improved track system which achieves one or more of the aforementioned goals with increased efficiency and minimum cost.

SUMMARY OF THE INVENTION

The present invention provides a dual rail track system for independently moveable carts in an industrial control environment in which upper and lower rails of a track are substantially "L" shaped to allow upper and lower groups of rollers of a cart to orthogonally contact the upper and lower rails, respectively, to provide vertical and horizontal control of the cart while in motion along the track. The shape of the rails and arrangement of the rollers, orthogonal with respect to the rails in vertical and horizontal planes, provides an efficient support system allowing high speed movement of carts, including through turns, with only two rails and with symmetric weight distribution of the cart. Flexible members provided with respect to each roller also provide resiliency to allow the rollers to adapt to variations in the track.

In one aspect, a dual track/mover system can optimize structural support and controlled movement of a cart by utilizing normal bearing contact surfaces of tracks and adapting to variations by way of compliances. The system can consist of two tracks, each track supporting the mover in the horizontal and vertical planes. The system can consist of two symmetrical L-shaped tracks that support radially loaded rollers. The system can consist of compliances (intentionally flexible members) that adjust to variations in track dimensions while maintaining positions of hard mount rollers on the tracks. Accordingly, independent track movers can support loads and be positioned and retained on a track system while allowing for ease of movement and handling of component manufacturing/assembly variations.

Track Components can comprise rectangular track surfaces (for horizontal control) and flat track surfaces (for vertical control). A flexible member (compliance) can allow rollers to adapt to track variations. Accordingly, rollers can preferably act normal to the track—loaded radially.

Aspects of the invention can provide: tracks and. movers designed for normal (radial) loading of bearings; tracks supporting movers in dedicated horizontal and vertical planes; adjustable flexure/compliance utilization to adapt to variations in the track due to manufacture, assembly, design, wear, and the like; use of standard roller bearings without special shapes being required; use of only two symmetrical tracks, thereby decreasing the part count; efficient use of available space for compact design; and/or a symmetrical design of the mover around a motion magnet.

Specifically then, one aspect of the present invention may provide an industrial control system for moving objects, including: a track having first and second rails, the first and second rails each including first and second extension portions projecting perpendicular to one another; and a mover having multiple rollers configured to engage only the first and second rails, the rollers including first and second groups of rollers engaging the first and second rails, respectively, in which each group of rollers includes at least two rollers engaging a first extension portion on opposing sides of the first extension portion and at least one roller engaging a second extension portion on a single side of the second extension portion.

Another aspect of the present invention may provide a method for moving objects in an industrial control system, including: providing a track having first and second rails, the first and second rails each including first and second extension portions projecting perpendicular to one another; and supporting an object on a mover, the mover having multiple rollers engaging only the first and second rails, the rollers including first and second groups of rollers engaging the first and second rails, respectively, in which each group of rollers includes at least two rollers engaging a first extension portion on opposing sides of the first extension portion and at least one roller engaging a second extension portion on a single side of the second extension portion.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 2 is a cross sectional view of an exemplar cart along the track, taken along line A-A of FIG. 1; and.

DETAILED DESCRIPTION OF THE OF THE INVENTION

Figure 1:
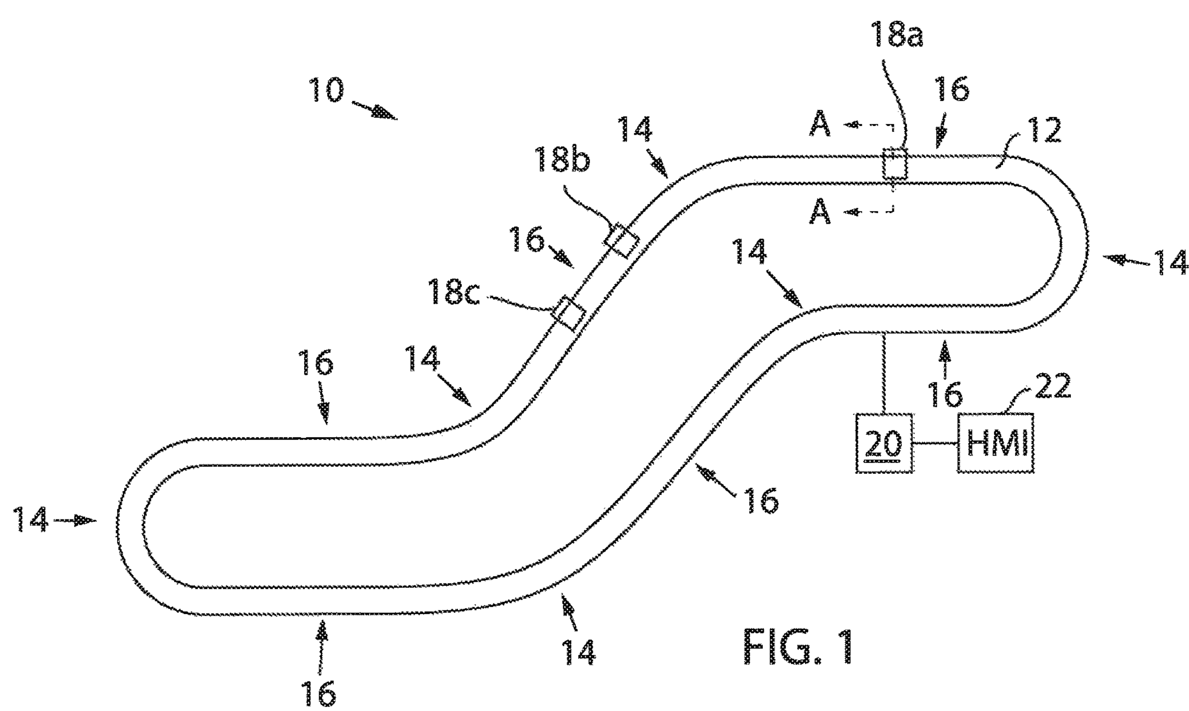
FIG. 1 is an exemplar industrial control system including a track having curved and linear sections and multiple carts for moving objects along the track in accordance with an aspect of the invention.

Referring now to FIG. 1, in accordance with an aspect of the invention, an exemplar industrial control system 10 includes a track 12 having curved sections 14 and linear sections 16. Multiple independently moveable carts 18, such as carts 18*a*, 18*b* and 18*c*, can be provided for moving objects along the track 12 from one location to another for accomplishing various tasks in the industrial control system 10. The track 12 can be connected to a controller 20, such as a Programmable Logic Controller (PLC) or other industrial controller including a processor executing a program stored in a non-transient medium, which can communicate with a Human Machine Interface (HMI) 22 for providing I/O, for carrying out various aspects of industrial control. It will be appreciated that the track 12, being flexibly capable of curved and linear sections according to various geometries, can be configured to implement a wide variety of paths and orientations as may be required in an industrial control or factory environment. The track 12 can include evenly distributed coils along the track that are selectively controlled by the controller 20 to produce various electromagnetic (EM) fields for propelling the carts 18. The track 12 can also include evenly distributed locating sensors along the track, such as Hall Effect sensors, for determining positions of the carts 18.

Figure 2:
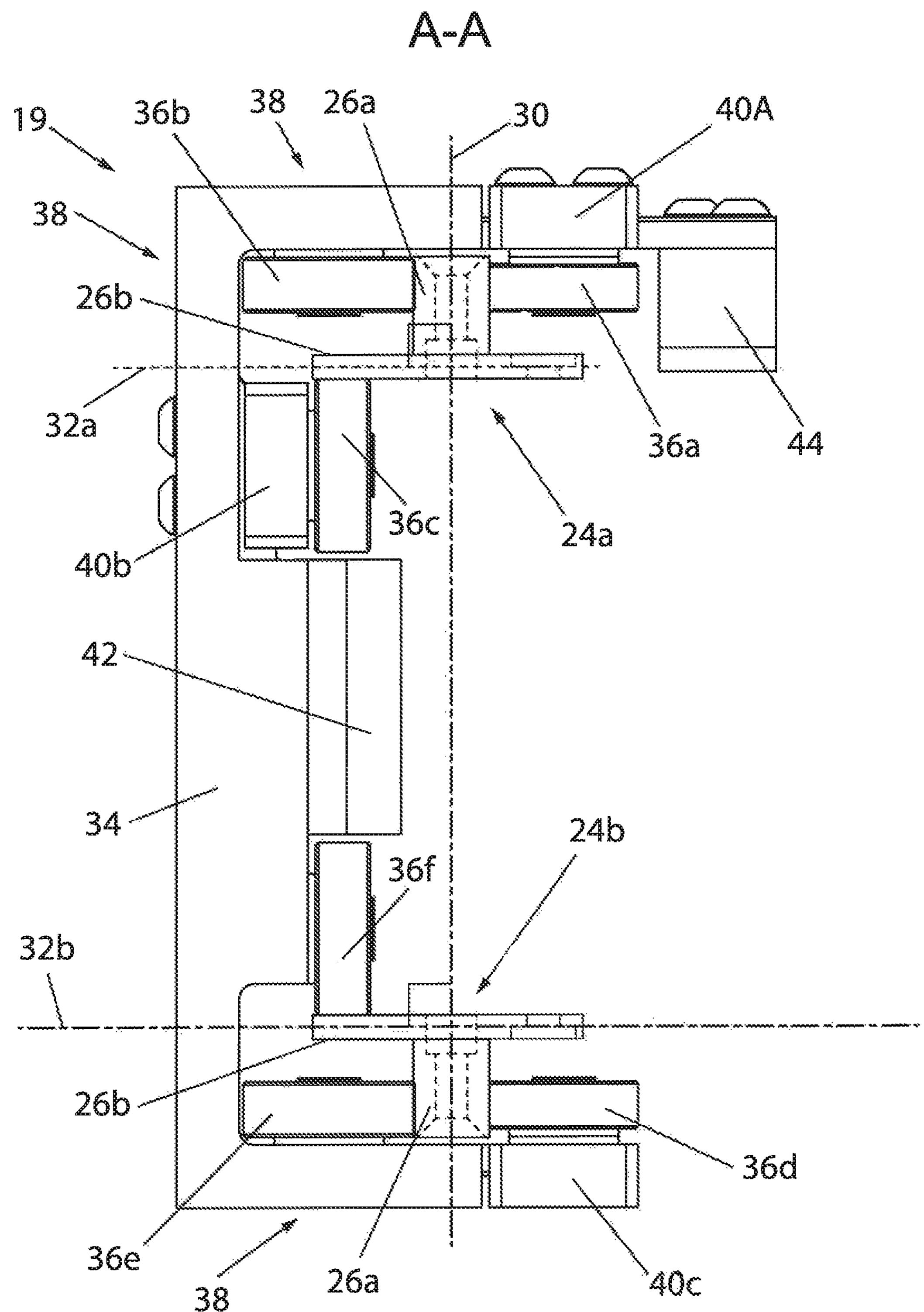

Referring now to FIG. 2, a cross sectional view of an exemplar mover 19, which may be part of a cart 18, disposed along the track 12, taken along line A-A of FIG. 1, is provided in accordance with an aspect of the invention. The track 12 has first and second rails, 24*a* and 24*b*, respectively, which are preferably symmetrical upper and lower rails with respect to a ground surface below the track 12. The first and second rails 24*a* and 24*b*, respectively, each include first and second extension portions 26*a* and 26*b*, respectively projecting perpendicular to one another. The first extension portions 26*a* of the first and second rails 24*a*. and 24*b*, respectively, can be axially aligned along a vertical axis 30, arranged vertically with respect to the track 12. Accordingly, the first extension portions 26*a* of the first and second rails 24*a* and 24*b*, respectively, can control horizontal motion of the mover 19. The second extension portions 26*b* of the first and second rails 24*a* and 24*b*, respectively, can be parallel to one another along first and second horizontal axes 32*a* and 32*b*, arranged horizontally with respect to the track 12. Accordingly, the first extension portions 26*a* of the first and second rails 24*a* and 24*b*, respectively, can control vertical motion of the mover 19.

The mover 19 can include a frame 34, which may be aluminum, supporting multiple rollers 36 (shown in FIG. 2 as rollers 36*a-f*) in communication with the track 12. The frame 34 can include one or more attachment or work areas 38 above, below or a side of the cart 18 which could be used to engage mechanical structures used to accomplish various industrial control functions for moving objects along the track 12 (thereby forming carts 18 carrying payloads) as may be required in the industrial control system. The rollers 36, which could comprise standard bearings or wheels, can be configured to engage only the first and second rails 24*a* and 24*b*, respectively, of the track 12. The rollers 36 can therefore be configured to engage only the first and second rails 24*a* and 24*b*, respectively, at right angles (perpendicular or orthogonal) to one another. Accordingly, the first and second rails 24*a* and 24*b*, respectively, provide normal (radial) loading with respect to the rollers 36.

A first group of rollers 36*a*, 36*b* and 36*c* can engage the first rail 24*a*. In particular, at least two rollers of the first group, 36*a* and 36*b*, can engage the first extension portion 26*a* on opposing sides of the first extension portion 26*a* of the first rail 24*a*. Also, at least one roller of the first group, 36*c*, can engage the second extension portion 26*b* on a single side of the second extension portion 26*b* of the first rail 24*a*.

Similarly, a second group of rollers 36*d*, 36*e* and 36*f* can engage the second rail 24*b*. In particular, at least two rollers of the second group, 36*d* and 36*e*, can engage the first extension portion 26*a* on opposing sides of the first extension portion 26*a* of the second rail 24*b*. Also, at least one roller of the second group, 36*f*, can engage the second extension portion 26*b* on a single side of the second extension portion 26*b* of the second rail 24*b*.

The rollers 36*a*, 36*b*, 36*d* and 36*e* engaging the first extension portions 26*a* of the first and second rails 24*a* and 24*b*, respectively, can be distal to one another (with an extension portion in between) as shown in FIG. 2. In other words, the rollers 36*a* and 36*b* can engage the first extension portion 26*a* of the first rail 24*a*, being an upper rail, on an upper side; and/or the rollers 36*d* and 36*e* can engage the first extension portion 26*a* of the second rail 24*b*, being a lower rail, on a lower side. However, in an alternative aspect, the rollers 36*a*, 36*b*, 36*d* and 36*e* could engage the first extension portions 26*a* of the first and second rails 24*a* and 24*b*, respectively, proximal to one another (without an extension portion in between). For example, the rollers 36*a* and 36*b* could engage the first extension portion 26*a* of the first rail 24*a*, being an upper rail, on a lower side; and/or the rollers 36*d* and 36*e* could engage the first extension portion 26*a* of the second rail 24*b*, being a lower rail, on an upper side.

Similarly, the rollers 36*c* and 36*f* engaging the second extension portions 26*b* of the first and second rails 24*a* and 24*b*, respectively, can be proximal to one another (without an extension portion in between) as shown in FIG. 2. In other words, the roller 36*c* can engage the second extension portion 26*b* of the first rail 24*a*, being an upper rail, on a lower side; and/or the roller 36*f* can engage the second extension portion 26*b* of the second rail 24*b*, being a lower rail, on an upper side. However, in an alternative aspect, the rollers 36*c* and 36*f* could engage the second extension portions 26*b* of the first and second rails 24*a* and 24*b*, respectively, distal to one another (with an extension portion in between). For example, the roller 36*c* could engage the second extension portion 26*b* of the first rail 24*a*, being an upper rail, on an upper side; and/or the roller 36*f* could engage the second extension portion 26*b* of the second rail 24*b*, being a lower rail, on a lower side.

Figure 3:
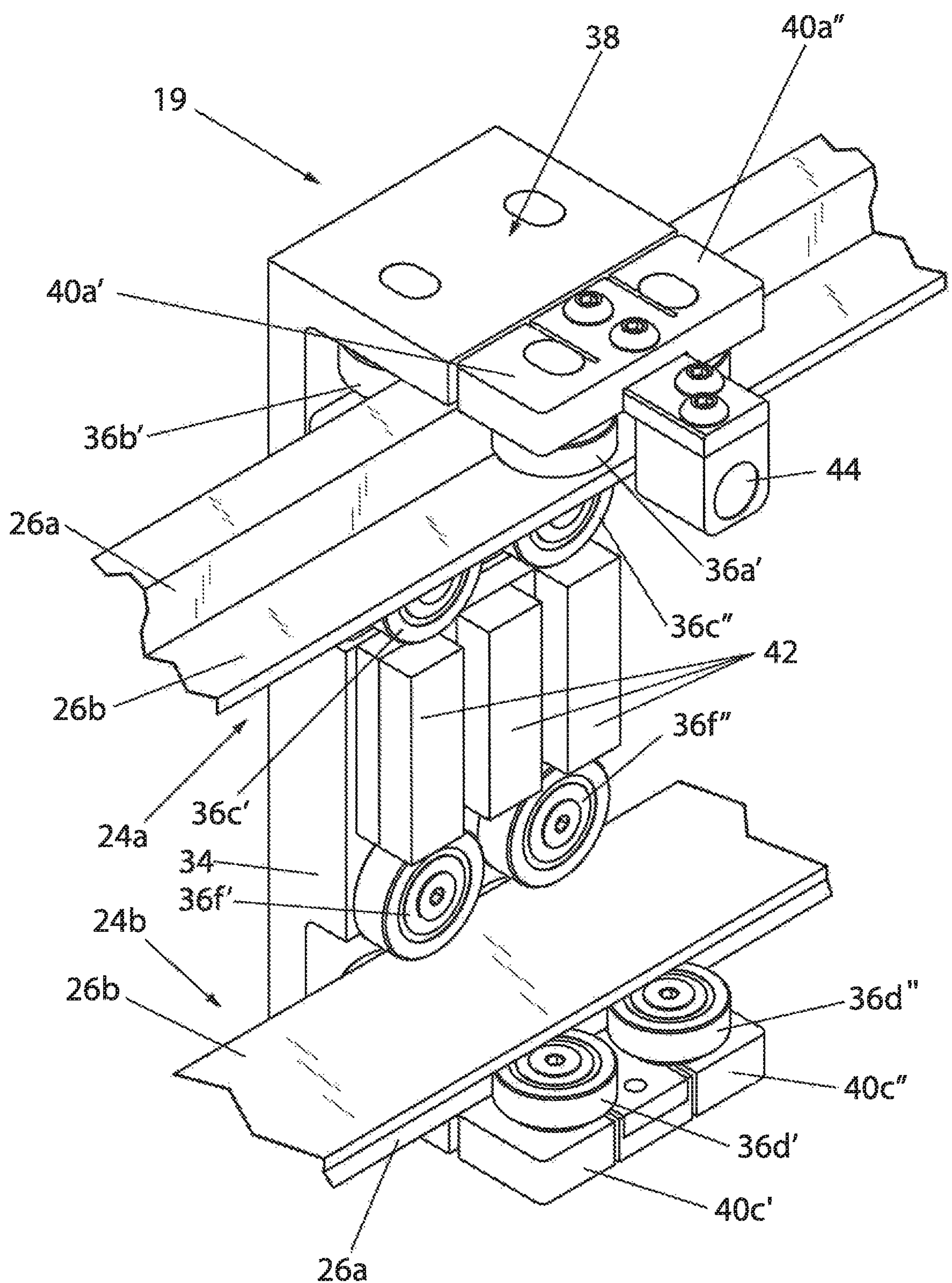
FIG. 3 is an isometric view of the cart of FIG. 2 along the track.

In addition, as shown in FIG.3, for increased load capability each group of rollers 36 could include two or more rollers 36 engaging an extension portion on a given side. For example, rollers 36*a*' and 36*a*" can engage the first extension portion 26*a* of the first rail 24*a* on a first side; rollers 36*b*' and 36*b*" can engage the first extension portion 26*a* of the first rail 24*a* on a second side opposing the first side; rollers 36*c*' and 36*c*" can engage the second extension portion 26*b* of the first rail 24*a* on a common side (without any rollers on an opposing side); rollers **36*d*' and 36*d*'' can engage the first extension portion 26*a* of the second rail 24*b* on a first side; rollers 36*e*' and 36*e*'' (not visible in FIG. 3) can engage the first extension portion 26*a* of the second rail 24*b* on a second side opposing the first side; and/or rollers 36*f*' and 36*f*'' can engage the second extension portion 26*b* of the second rail 24*b*** on a common side (without any rollers on an opposing side).

In one aspect, one or more flexible members 40 can be provided for added "compliance" with respect to rollers 36. The flexible members 40 can provide resiliency to allow corresponding rollers 36 to adapt to variations in the track 12, similar to an independent suspension system for an automobile adapting to variations in the road. Each flexible member 40 can be configured to maintain contact between a corresponding roller 36 and a targeted extension portion with resiliency. An opposing side of the targeted extension portion can maintain a constant engagement of the roller 36 to the extension portion with rigidity, thereby providing an adaptive grip of the track. For example, as shown in FIG. 2, a flexible member **40*a* can be configured to maintain flexible contact between roller 36*a* and the first extension portion 26*a* of the first rail 24*a* with resiliency (while roller 36*b* maintains a constant engagement of the first extension portion 26*a* of the first rail 24*a* with rigidity); a flexible member 40*b* can be configured to maintain flexible contact between roller 36*c* and the second extension portion 26*b* of the first rail 24*a* with resiliency (while roller 36*f* maintains a constant engagement of the second extension portion 26*b* of the second rail 24*b* with rigidity); and/or a flexible member 40*c* can be configured to maintain flexible contact between roller 36*d* and the first extension portion 26*a* of the second rail 24*b* with resiliency (while roller 36*e* maintains a constant engagement of the first extension portion 26*a* of the second rail 24*b*** with rigidity).

To move the mover 19, a power winding (coils) disposed along on the track 12 can be selectively energized to electromagnetically react with one or more propulsion magnets 42 affixed to the mover 19 across an air gap to thereby move the cart 18. With the dual track system configured as described herein, the one or more propulsion magnets 42 can advantageously be configured symmetrically with respect to the mover 19, preferably being arranged between the aforementioned first and second groups of rollers 36.

For determining a position of the mover 19 along the track 12, the system 10 can implement an encoder system including one or more position magnets 44. The position magnets 44 can be arranged to face locating sensors disposed along the track across a second air gap.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. it is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial automation transport system, comprising:

a track having a first rail and a second rail spaced from the first rail, the first and second rails each including a first extension portion and a second extension portion that is oriented. transverse to the first extension portion; and at least one mover having a plurality of rollers configured to engage the first and second rails, the plurality of rollers including a first group of rollers configured to engage the first rail and a second group of rollers configured to engage the second rail, wherein each group of rollers includes at least two rollers contacting the first extension portion of a respective rail and at least one roller contacting a second extension portion of the respective rail, and. each of the at least two rollers contacts an opposing side surface of the first extension portion, and an axis of the at least one roller is substantially parallel to the second extension portion, and wherein the at least one roller from each group of rollers contacts a respective opposing surface of the second extension portions.

2. The system of claim 1, wherein e first extension portions of the first and second rails are axially aligned.

3. The system of claim 2, wherein the first extension portions of the first and second rails are arranged vertically with respect to the track to control horizontal motion of the at least one mover.

4. The system of claim 1, wherein the second extension portions of the first and second rails are parallel to one another.

5. The system of claim 4, wherein the second extension portions of the first and second rails are arranged horizontally with respect to the track to control vertical motion of the at least one mover.

6. The system of claim 4, wherein the at least one mover includes a plurality of flexible members, wherein each flexible member is configured to maintain contact between a roller and an extension portion with resiliency.

7. The system of claim 1, wherein each group of rollers includes two rollers engaging the first extension portion on a first side, two rollers engaging the first extension portion on a second side opposing the first side, and two rollers engaging the second extension portion on a common side.

8. The system of claim 1, wherein the track has curved and linear sections.

9. The system of claim 1, wherein the mover includes a propulsion magnet for propelling the mover along the track, and wherein the propulsion magnet is symmetrically arranged between the first and second groups of rollers.

10. The system of claim 1, wherein the mover includes a position magnet for determining positions of the mover along the track, wherein the position magnet is arranged to face locating sensors disposed along the track across an air gap.

11. An industrial automation transport method, comprising:

providing a track having a first rail and a second rail spaced from the first rail, the first and second rails each including a first extension portion and. a second extension portion that is oriented transverse to the first extension portion; and providing at least one mover having a plurality of rollers configured to engage the first and second rails, the plurality of rollers including a first group of rollers configured to engage the first rail and a second group of rollers configured to engage the second rail, wherein each group of rollers includes at least two rollers contacting the first extension portion of a respective rail and at least one roller contacting a second extension portion of the respective rail, and each of the at least two rollers contacts an opposing side surface of the first extension portion, and an axis of the at least one roller is substantially parallel to the second extension portion, and wherein the at least one roller from each group of rollers contacts a respective opposing surface of the second extension portions.

12. The method of claim 11, wherein the first extension portions of the first and second rails are axially aligned.

13. The method of claim 12, wherein the first extension portions of the first and second rails are arranged vertically with respect to the track to control horizontal motion of the at least one mover.

14. The method of claim 11, wherein the second extension portions of the first and second rails are parallel to one another.

15. The method of claim 14, wherein the second extension portions of the first and second rails are arranged horizontally with respect to the track to control vertical motion of the at least one mover.

16. The method of claim 14, wherein the at least one mover includes a plurality of flexible members, and further comprising each flexible member maintaining contact between a roller and an extension portion with resiliency.

17. The method of claim 11, wherein each group of rollers includes two rollers engaging the first extension portion on a first side, two rollers engaging the first extension portion on a second side opposing the first side, and two rollers engaging the second extension portion on a common side.

18. The method of claim 11, wherein the track has curved and linear sections.

19. The method of claim 11, wherein the at least one mover includes a propulsion magnet for propelling the at least one mover along the track, and wherein the propulsion magnet is symmetrically arranged between the first and second groups of rollers.

20. An industrial automation transport system, comprising:

a track having a first rail and a second rail spaced from the first rail, the first and second rails each including a first extension portion and a second extension portion that is oriented transverse to the first extension portion; and at least one mover having a plurality of rollers configured to engage the first and second rails, the plurality of rollers including a first group of rollers configured to engage the first rail and a second group of rollers configured to engage the second rail, wherein each group of rollers includes at least two rollers contacting the first extension portion of a respective rail and at least one roller contacting a second extension portion of the respective rail, and each of the at least two rollers contacting the first extension portion contacts an opposing side surface of the first extension portion, and an axis of the at least one roller contacting the second extension portion is substantially parallel to the second extension portion, wherein the at least one roller from each group of rollers contacts a respective opposing surface of the second extension portions, and wherein the at least one mover includes a plurality of flexible members, each flexible member being configured to maintain contact between a roller and an extension portion.

* * * * *